(12) United States Patent
Pacey

(10) Patent No.: US 7,120,564 B2
(45) Date of Patent: Oct. 10, 2006

(54) BURIED LINE LOCATOR WITH INTEGRAL POSITION SENSING

(75) Inventor: Gordon Pacey, Sunnyvale, CA (US)

(73) Assignee: Metrotech Corporation, Santa Clara, CA (US)

( * ) Notice: Subject to any disclaimer, the term of this patent is extended or adjusted under 35 U.S.C. 154(b) by 330 days.

(21) Appl. No.: 10/407,705

(22) Filed: Apr. 3, 2003

(65) Prior Publication Data

US 2005/0096883 A1 May 5, 2005

(Under 37 CFR 1.47)

(51) Int. Cl.
G06F 19/00 (2006.01)
G01V 3/00 (2006.01)

(52) U.S. Cl. .......................... 702/193; 702/94; 702/97; 702/150; 702/189; 340/854.8

(58) Field of Classification Search ................ 702/4–6, 702/38, 40, 85, 94, 97, 141, 150, 152, 189, 702/193; 324/326–327; 342/124; 340/854.8
See application file for complete search history.

(56) References Cited

U.S. PATENT DOCUMENTS

| | | | |
|---|---|---|---|
| 4,357,833 A | 11/1982 | Wiklund et al. | |
| 5,321,613 A | 6/1994 | Vandergraft et al. | |
| 5,457,998 A | 10/1995 | Fujisaki et al. | |
| 5,576,973 A | 11/1996 | Haddy | |
| 5,917,325 A | 6/1999 | Smith | |
| 6,003,376 A | 12/1999 | Burns et al. | |
| 6,144,341 A | * 11/2000 | Kraz ......................... | 343/703 |
| 6,215,888 B1 | 4/2001 | Eslambolchi et al. | |
| 6,333,631 B1 | * 12/2001 | Das et al. .................. | 324/326 |
| 6,407,550 B1 | * 6/2002 | Parakulam et al. ......... | 324/326 |
| 6,437,726 B1 | 8/2002 | Price | |
| 6,522,907 B1 | 2/2003 | Anderson et al. | |

FOREIGN PATENT DOCUMENTS

GB 2357148 A 6/2001

OTHER PUBLICATIONS

Gefsrud, Rick, "Real–Time GPS Land Surveying," Proceedings of the Annual Meeting. Institute of Navigation. Navigating the 90's: Technology, Application and Policy XX XX, Jan. 1995, pp. 287–929.

* cited by examiner

*Primary Examiner*—Bryan Bui
(74) *Attorney, Agent, or Firm*—Finnegan, Henderson, Farabow, Garrett & Dunner, L.L.P.

(57) ABSTRACT

A device for detecting and compensating field distortion in underground line locators by means of mapping the field-strength of the field generated by electrical currents within the buried line. Signals from the underground structure can be mapped with respect to the position of the device. From the map, distortions from the expected signals can be determined, indicating interference from other structures or errors in detected location of the structure.

49 Claims, 6 Drawing Sheets

BURIED LINE LOCATOR WITH INTEGRAL POSITION SENSING

BACKGROUND

1. Field of the Disclosure

This disclosure relates to the field of electronics and, in particular, to the application of devices that can be used to locate objects that are concealed or situated underground.

2. Related Art

Line locators are used to locate the position of lines buried in the ground, such as gas pipes, water pipes, telephone cables, and power cables. A line locator typically includes a transmitter and a receiver. The transmitter causes an electromagnetic field to be radiated from the line to be located. The receiver locates the line by detecting the radiated field. Line locators may be operated in one of two modes, a direct connection mode and an inductive mode.

In direct connection mode, the transmitter is physically connected to the line to be located, typically at a point in the line that is above the ground. The transmitter generates a voltage at one end of the line, causing an electrical current to flow along the conductive line. The current produces an electromagnetic field around the line, which can be detected by the receiver of a line locator.

In cases where direct connection to the line is not possible, for example if the line is completely underground, line locators typically operate in an inductive mode. In inductive mode the line locator produces current in the line by electromagnetic induction: A time-varying electromagnetic field is radiated by an antenna, which induces an electrical current in the line to be located. The current in the line then produces an electromagnetic field around the line and the electromagnetic field is detected by a receiver in the line locator.

To locate the line, an operator typically moves the receiver over the surface of the ground until the presence of an electromagnetic field is indicated and, therefore, the location of the line is determined. The receiver measures the strength of the electromagnetic field, which is proportional to the current in the buried, or target, line. According to Ohm's Law, the current in the line is inversely proportional to the impedance of the line. Because of the wide variability of the physical condition of buried lines and the wide variability of the environment of these lines, the impedance of buried lines can have virtually any value. However, in most situations a particular current can be induced so that the line can generate an electromagnetic field.

Line locators available today are effective in locating and tracing buried lines. However, there are situations in which the use of a line locator can result in the improper determination of the location of the line, which can result in damage to the line or serious injury to a person excavating near the line. Such a situation can occur when there are structures or objects in the vicinity of a target line that affect the measurements made by the receiver. An example of this effect is when there are several lines buried in the ground in close proximity to the target line. The electrical current in the target line can induce electrical currents in the adjacent lines, whereby the electromagnetic field generated by the target line is distorted. A distorted field can result in an incorrect determination of the location of the line as well as an inaccurate measurement of depth. Also, the locator may find an adjacent line other than the target line due to bleed-over of the electromagnetic field from the target line onto the adjacent line.

One method that can be utilized to deal with the effects of distorted fields is to measure and record the strength of the electromagnetic field and the spatial position at which each measurement of the electromagnetic field strength is taken. For such a system to be useful in many situations, the system would be required to have a positional accuracy of less than about one inch over a range of several hundred feet, and the system would need to operate in real-time with measurements made at a rate on the order of ten times per second.

One way to determine the position of each measurement of field strength is to use the Global Positioning System (GPS). In this approach, a GPS receiver is operated together with the line locating receiver and the data from both is recorded. The problem with the use of GPS for this purpose is that the accuracy of GPS or even Differential GPS (DGPS), is not generally sufficient. The expected accuracy of GPS is from ten to twenty feet, whereas the expected accuracy of DGPS is from three to five feet. This accuracy is not sufficient for dealing with distorted electromagnetic fields from underground lines. Although some embodiments of GPS provide an accuracy of less than one inch, these measurements cannot be made in real time as the receiver of the locator is moved at reasonable rates spatially over the area of interest.

Another problem in the field of underground line location is the need to keep track of the position of buried lines over periods that last more than a few hours or days. Presently, operators who perform underground line location often mark the location of the line by painting lines on the ground above the buried line. However, it is often necessary to locate the lines with respect to landmarks in the vicinity of the lines in the event that the paint wears away or is moved. At present line locations are maintained by using a tape measure or other external measuring devices to create lines between the landmarks or remaining painted lines. However, as stated above, the accuracy required for line location often needs to be less than one inch. Tape measures used in this fashion do not provide the required level of accuracy. Further, the length of time required to obtain accurate positional data for line locator measurements using a tape measure is generally prohibitive.

Therefore, there is a need for a line locating system capable of measuring the strength of an electromagnetic field and simultaneously and accurately measuring the spatial position associated with the measurement of field strength. There is also a need for a line locating system that can accurately maintain a determination of the location of underground lines for long periods of time so that those lines can be determined at a later date.

SUMMARY

In accordance with the present invention, a line locator is presented that provides an accurate three-dimensional, spatial map of the electromagnetic field strength that emanates from a target line. A line locator according to the present invention includes a receiver to measure the electromagnetic field strength, an accurate spatial locator for determining the spatial position of the receiver, and a processor that records the electromagnetic field strengths and the spatial positions. In some embodiments, the processor can provide a mapping of the electromagnetic field strength as a function of spatial position. In some embodiments, the data can be retrieved from the line locator onto a separate processing system. In some embodiments, the mapping may be utilized to determine the location of underground lines.

In some embodiments of the invention, the accurate spatial locator includes an inertial mapping system to continuously determine the location of the receiver as it is moved over an area of interest. An example of such an inertial mapping system would include one or more accelerometers. An accelerometer provides a signal indicative of the instantaneous acceleration of the accelerometer. Such a signal, integrated twice, provides the position of the receiver as a function of time. An accelerometer system, then, can accurately provide the position of the receiver based on the measured acceleration of the accelerometer system from a pre-determined starting point during the time of the measurement.

In some embodiments of the invention, the accurate spatial locator implements a triangulation or tri-laterating mapping system. In some embodiments of such a system, one or more transmitters are placed around the area of interest. The accurate spatial locator receives signals from the one or more transmitters and determines the position of the receiver from the signals received. An accurate determination of the location of the accurate spatial locator with respect to the position of the one or more transmitters can be made.

In some embodiments of the invention, the accurate spatial locator includes a range-finder, which in some embodiments can be a laser range-finder. The range-finder may be mounted on a motor-driven gimble that tracks a target object. The target object may be a mirror or any other object that would reflect the emitted radiation (e.g., laser light, infrared, or acoustic) back to the range-finder. The spatial position of the receiver can be determined from the distance to the target object and the orientation of the gimble. The orientation of the gimble can be determined, for example, by maximizing the intensity of the reflected radiation at the range finder while monitoring the orientation of the transmitter with respect to the line locator.

Line locators according to the present invention can provide data to generate an accurate mapping of electromagnetic field strength as a function of spatial position over an area of interest. Such data can be utilized, along with modeling software, to determine the location of underground lines and surrounding structures that may distort the electromagnetic fields emanating from those lines. A more accurate determination of the physical location of the lines of interest can then be made.

These and other embodiments of the invention are more fully discussed below with respect to the following figures.

In the figures, elements having the same designation have the same or similar functions.

DETAILED DESCRIPTION

Figure 1:
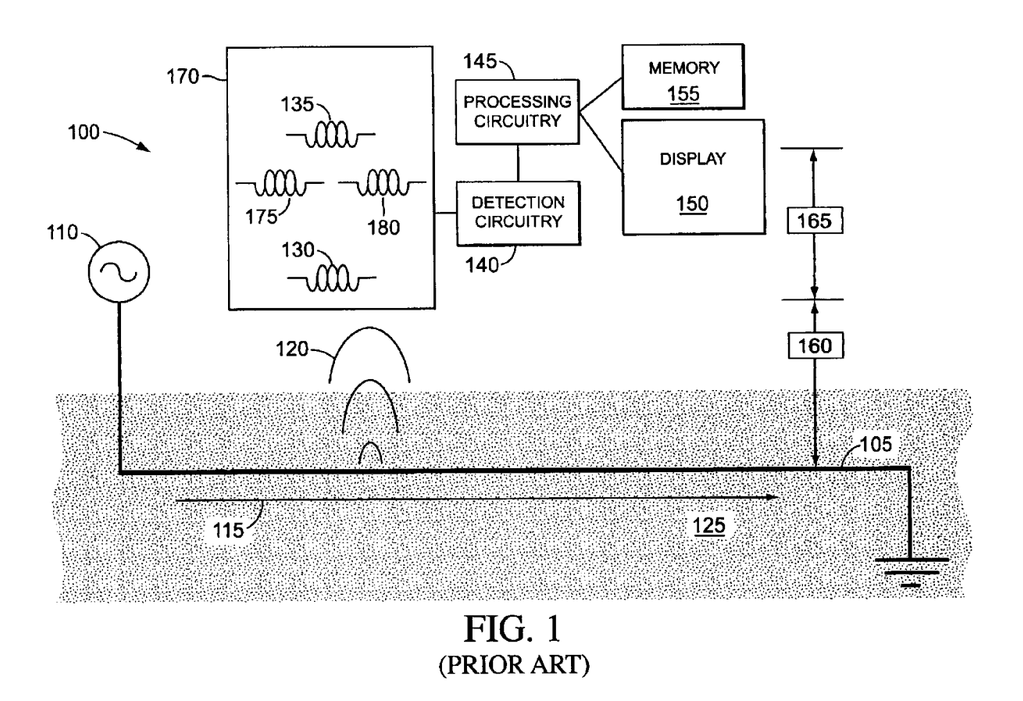
FIG. 1 illustrates a schematic diagram of a conventional line locator system.

FIG. 1 shows a schematic diagram of a conventional line locator system 100 positioned above a line 105. Transmitter 110 can be coupled to line 105 in order to induce current 115 to flow through line 105. As current 115 flows through line 105, it generates electromagnetic field 120 that is radiated from line 105. If current 115 is constant, electromagnetic field 120 is a static electromagnetic field. If current 115 is time varying, electromagnetic field 120 is also a time-varying electromagnetic field. A portion of the electromagnetic field 120 penetrates ground 125, where it can be detected by receiver 170 of line locator 100. In the embodiment of locator 100 shown in FIG. 1, receiver 170 includes detectors 130, 135, 175 and 180, which can be positioned to determine both the depth of line 105 and the lateral position of line 105.

Transmitter 110 is shown in a direct connection mode, i.e. transmitter 110 is electrically coupled to line 105. The electrical connection can, for example, be accomplished at a point where line 105 emerges above the surface of ground 125. In some cases, transmitter 110 can also operate in inductive mode, where current 115 is induced in line 105 by electromagnetic induction. In some cases, line 105 is already carrying a current, for example, A/C power at 60 Hz, and no transmitter 110 is required.

Line locator 100 detects the electromagnetic field at detectors 130, 135, 175 and 180. Detectors 130, 135, 175 and 180 in FIG. 1 are shown as coil type detectors, but any detector capable of measuring an electromagnetic field can be utilized. Detectors 130, 135, 175 and 180 are coupled to detection circuitry 140. Detection circuitry 140 receives signals from detectors 130, 135, 175 and 180 and provides amplification and filtering for those signals. In some cases, the signals may be digitized in detection circuitry 140. Processing circuitry 145 receives signals from detection circuitry 140 and performs operations to calculate depth and location of line 105 based on the magnetic fields measured at detectors 130, 135, 175 and 180. Processing circuitry 145 can be analog circuitry or can be a microprocessor. The results of the calculations can then be displayed to an operator on display 150 and, in some embodiments, stored in memory 155.

Left right detection and electronic circuits applicable to line location are further described in U.S. Pat. No. 6,407,550, titled "Line Locator Having Left/Right Detection," to Gopal Parakulum and Steven Polak, which is herein incorporated by reference in its entirety, and U.S. Pat. No. 6,130,539, "Automatic Gain Control for a Line Locator," to Steven Polak, herein incorporated by reference in its entirety.

Referring again to FIG. 1, line locator 100 locates line 105 by detecting a radiated electromagnetic field 120. Some receivers contain pairs of electromagnetic field sensors for determining depth and position of lines to be located. As an example, receiver 170 uses detectors 175 and 180 to determine lateral (i.e. horizontal) position and detectors 130 and 135 to determine depth. Each of detectors 130, 135, 175 and 180 generate signals in response to electromagnetic field 120. Detection electronics 140 generate signals for processor 145 based on the signals generated by 130, 135, 175 and

180. Processing circuitry 145 compares the signals from detectors 175 and 180 to calculate lateral position of line 105 and processes the signals from detectors 130 and 135 to calculate distance to line 105. This information is sent to display 150 to be viewed by the operator.

In order to locate line 105, an operator moves line locator over the surface of ground 125 until receiver 170 communicates that the signals detected by detectors 175 and 180 are equal, indicating that line locator 130 is centered over the source of magnetic field 120, which is also the location of line 105.

To determine depth, detectors 130 and 135 can be used to measure the strength of electromagnetic field 120 at two different distances, 160 and 165, from line 105. In some embodiments, the ratio of magnetic field strength in each of detectors 130 and 135 (which are a known distance 165 apart) can be used to calculate the distance to line 105 from receiver 170. Methods for depth determination that are applicable to line location are further described in U.S. patent application Ser. No. 10/189,342, titled "Detecting Field Distortion In Underground Line Location," to Russell N. Bigelow, which is herein incorporated by reference in its entirety.

In an example of a model for determining the electromagnetic field generated from line 105, the strength of magnetic field 120, B, as a function of current 120, i, flowing in line 105 at distance 160, referred to as d in Equation 1, is given in Equation 1, assuming no distortion of electromagnetic field 120.

$$B \propto \frac{i}{d} \quad [1]$$

Assuming that detectors 130 and 135 have linear responses, or the responses can be linearized by detection circuitry 140, the output signal from an arbitrary one of detectors 130 and 135 is given by Equation 2. In Equation 2, i is the current 115 induced on line 105, distance $d_n$ is the vertical distance between the detector and line 105, response constant $k_n$ is a constant that includes the influence of receiver efficiency, gain, and all other detection parameters, and n indicates an arbitrary one of detectors 130 and 135.

$$s_n = k_n \cdot \frac{i}{d_n} \quad [2]$$

In line locator 100 shown in FIG. 1, detector 130 is at a distance 160, or d, from line 105 and detector 135 is at a distance 165, or (d+a) in Equation 3, from line 105. Detector 130 has a response constant $k_1$ while detector 135 can have a response constant $k_2$. Using Equation 2, then, the ratio of signals from detector 130, $s_1$, to the signal from detector 135, $s_2$, is given by Equation (3).

$$\frac{s_1}{s_2} = \frac{k_1}{k_2} \frac{d+a}{d}. \quad [3]$$

Defining $k_{12}$ to be the ratio of $k_2$ to $k_1$ (i.e., $k_2/k_1$) and solving for d yields Equation 4.

$$d = \frac{a}{k_{12}(s_1/s_2) - 1}. \quad [4]$$

To allow line locator 100 to determine an unknown distance d, the ratio $k_{12}$ can be determined during a calibration step and fixed. This calibration can typically be accomplished by making measurements on one or more current carrying lines 105 at known distances under known conditions. Calibration methods and systems that can be used with embodiments of line locators described herein are further described in U.S. patent application Ser. No. 10/189,303, titled "Model Based Calibration For Line Locator," to Russell N. Bigelow and Steven Polak, which is herein incorporated by reference in its entirety.

In a calibration procedure, because the distance d is known, a is the physical distance between the detectors, and $s_1$ and $s_2$ are measured, $k_{12}$ for a particular pair of detectors 130 and 135 can be calculated from Equation 5.

$$k_{12} \equiv \frac{k_2}{k_1} = \frac{s_2}{s_1} \frac{d+a}{d}. \quad [5]$$

When distance 160 to line 105 is to be measured, receiver 170 is positioned over line 105. A measurement consists of recording signals $s_1$ and $S_2$ (from detectors 130 and 135 respectively). Equation 4 is then applied to solve for distance 160, d.

In a case where an expected electromagnetic field generated by a single line source was expected, that field is described by Equation 1, and has the form 1/r with distance r being the distance from line 105. A field not obeying this 1/r relationship would be considered distorted. In order to measure whether an electromagnetic field obeys the 1/r relationship for a single line source, at least three measurements of the electromagnetic field strength can be made for detectors positioned at different distances from line 105.

Figure 2:
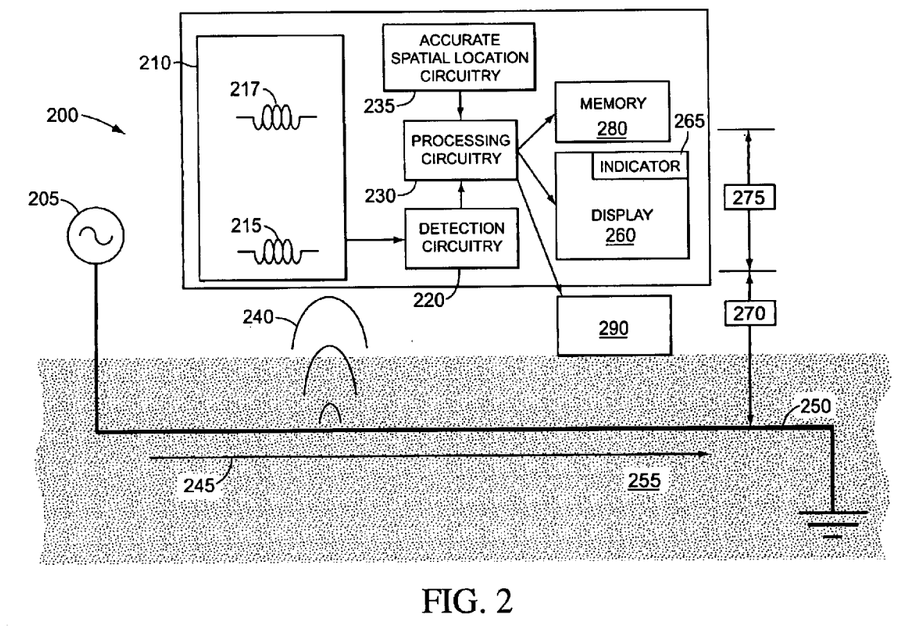
FIG. 2 illustrates a schematic diagram of an embodiment of a line locator system with an accurate spatial locator according to the present invention.

FIG. 2 illustrates a schematic diagram of an embodiment of a line locator system 200 according to the present invention. In the embodiment illustrated in FIG. 2, line locator 200 includes a transmitter 205 and a receiver 210. Transmitter 205 can operate in a fashion similar to that described with respect to transmitter 110 in FIG. 1. Also, transmitter 205 can be omitted or be part of receiver 210, thereby making the entirety of line locator 200 mobile, for example as in an underground marker locator.

Line locator 200 shown in FIG. 2 includes at least one detector that is coupled to detection circuitry 220. Two detectors 215 and 217 are shown in FIG. 2. Processing circuitry 230 receives signals from detection circuitry 220 and performs operations to calculate depth and location of line 250. Accurate spatial locator circuitry 235 is coupled to processing circuitry 225. Accurate spatial locator circuitry 235 determines the location of receiver 210 by determining a difference between a current position of receiver 210 and a reference position. The reference position can be calibrated at any time during operation of line locator 200 in an area-of-interest where a line is to be found and traced. Alternatively, the reference position can be a prior position where a determination of the strength of the electromagnetic field was made. In such a case, the reference position is not an absolute position and can constantly change.

Accurate spatial locator circuitry 235 monitors the position of receiver 210 based upon the motion of receiver 210. Accurate spatial location circuitry 235 according to the present invention includes positional detection circuitry capable of determining the location of line locator 200 with respect to a reference position to within a few inches over the entire area-of-interest. In some embodiments accurate spatial locator circuitry 235 can determine the difference of position utilizing one or more accelerometers. In some embodiments, accurate spatial locator circuitry 235 can determine the difference of position utilizing triangulation between one or more positioned transmitters located in or near the area-of-interest. In some embodiments, accurate spatial location circuitry 235 may include a range finder.

Detection circuitry 220, processing circuitry 230, and accurate spatial location circuitry 235 can be inter-related and fully incorporated in locator 200. In some embodiments, processing circuitry 230 may also include interface circuitry to provide communications with a larger processing system 290. In some embodiments, processing system 290 can receive data from accurate spatial location circuitry 235 and electromagnetic detection circuitry 220. Processing system 290, then, can process the received data in accordance with a model describing the strength of the electromagnetic fields as a function of spatial location in the area-of-interest in order that an accurate determination of the location of line 250 can be made. In some embodiments, processing system 290 can be any computer system, including a PC compatible system. Processing system 290 may be interfaced with processing circuitry 230 in any way, for example through a hard-wired connection, through a wireless connection, or optically. In some embodiments, data can be downloaded to processing system 290 after the data has been taken and stored in memory 280 by processing circuitry 230. In some embodiments of the invention, all data processing can be accomplished in processing circuitry 230.

Accurate spatial location circuitry 235 includes circuitry for determining the position of receiver 210. As discussed above, any system for accurately determining the position of receiver 210 can be included. In some embodiments, accurate spatial location circuitry 235 includes accelerometers. The spatial location of receiver 210 can then be determined by integrating the acceleration to determine the changes in position of receiver 210 as it is moved around the area-of-interest.

In some embodiments, accurate spatial location circuitry 235 includes either triangulation or tri-lateration circuitry for positional determination. In these embodiments, circuitry 235 includes an antenna for receiving signals from one or more transmitting stations. Transmitting stations may be locally placed in the area where the line is to be located or, in some embodiments, may be permanently placed existing transmitters. In addition, system 230 would include either circuitry or software functions for continually determining the position based upon the distance from the transmitting stations. If one transmitting station is utilized, then circuitry 235 can include two or more antennas in order to determine the direction as well as distance from receiver 210 to the transmitting station.

In some embodiments, accurate spatial location circuitry 235 includes a range finder system, which, for example, can include a laser transmitter and a laser receiver. A motor may be utilized to cause the transmitter and detector to move as necessary so that the same landmark or reflector is always utilized to reflect radiation (electromagnetic, optical, or acoustic) back to the receiver. Further, circuitry 235 would include either circuitry or software functions continually determining the position based upon the difference of the time of detection of the light transmitted by the receiver.

In operation, receiver 200 and detection circuitry 220 determine the magnitude of the electromagnetic field 240 measured at detectors 215, 217, and any other field detectors that may be included in receiver 210, while accurate spatial locator circuitry 235 determines a position of receiver 210. Electromagnetic field 240 is induced by a current 245 flowing in line 250 that is located in the ground 255. A map of magnitudes of electromagnetic field 240 at positions of receiver 210 can then be generated by processing circuitry 225 or processing system 290 based on data obtained by detection circuitry 220 and accurate spatial location circuitry 235. Memory 280 may be utilized to store data from accurate spatial location circuitry 235, detection circuitry 220, and other output signals from processing circuitry 230. A positional map of the electromagnetic field as a function of spatial positioning, then, can be created.

A depth of line 250 can also be determined using detectors 215 and 217, as described with respect to FIG. 1, where distances 270 and 275 are used in the same manner as distances 160 and 165. However, by creating a map of magnitudes of electromagnetic field 240 a determination as to the depth of line 250 need not be made at line locator 200 during operation of receiver 210. A more accurate determination of the location of line 250 may be made utilizing the higher processing power of processor system 290, which can be a computer or other device with better processing capability than may be available in processing circuitry 230.

A distortion in the electromagnetic field can then be detected by observing the magnitude of the electromagnetic field as a function of spatial positioning. The determination of the distortion in the electromagnetic field can be accomplished by comparing the magnitude of the electromagnetic field, and the changes in magnitude of the electromagnetic field, with respect to position at all the positions where the magnitude was determined to known magnitudes, and known changes in magnitude with position, of the magnetic field according to some model of the magnetic field as a function of position in the area-of-interest. The map of electromagnetic field strength as a function of spatial positioning, when compared with appropriate models, can then be used to determine the number and types of lines and other structures within ground 255.

In some embodiments, processing circuitry 230 can not only calculate depth, but can also calculate an error function based on how well the signals from detectors 215 and 217 fit to an expected relationship (for example Equation 1) that would be produced in response to a single line 250 of current 245.

Further, in some embodiments, display 260 includes a distortion indication 265 that indicates whether the magnitudes of the electromagnetic field detected at the detectors of receiver 210 appear distorted and that interfering structures are likely present in ground 255 in the area of line 250. Additionally, display 260 may also include a user interface to allow control by a user of features of line locator 200. Display 260 can be coupled to receiver 210 directly, or can be at a remote location and communicate with receiver 210 over a wireless or other communication medium. In some embodiments, display 260 can be combined with processor system 290.

In addition, both processing circuitry 230 and accurate spatial locator circuitry 235 can access memory 280 as needed to store and read positional information and readings of magnitudes of electromagnetic field 240.

In some embodiments of the present invention, receiver 210 includes several additional detectors to aid in determining the spatial shape of an arbitrary electromagnetic field. The additional detectors can be used to make measurements at additional points in space. Embodiments of receiver 210 can include any number of detectors from which different measurements of the electromagnetic field strength from line 250 can be calculated. In particular, receiver 210 may include lateral detectors, similar to detectors 175 and 180 shown in FIG. 1, and detectors arranged for measuring depth, such as detectors 215 and 217 as shown in FIG. 2. Further, in some embodiments it is possible to use a single detector 215, without additional detectors to measure the magnitude of electromagnetic field 240.

An advantage of the embodiment of line locator 200 as shown in FIG. 2 is that the electromagnetic field strength detected by receiver 210 is mapped in a localized geographic area. This mapping allows determination of distortion in an efficient manner since the exact shape of the field can be determined over a localized geographic area. Also, since the position of receiver 210 is determined at line locator 200, the flexibility of the system is increased. For example, line locator 200 can be used in areas where there is interference for GPS receivers or where GPS signal quality is poor. Further, by utilizing low cost electronics in accurate spatial locator circuitry 235, the cost of line locator is decreased versus those line locators that utilize GPS receivers. Finally, embodiments of line locator 200 according to the present invention include accurate position measurement 235, which is unavailable with GPS systems.

Figure 3:
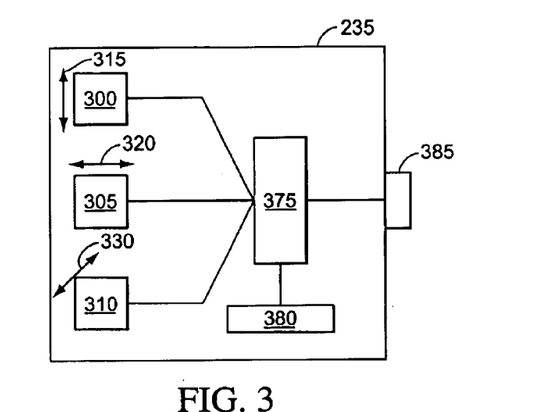
FIG. 3 illustrates a schematic diagram of an embodiment of the accurate spatial locator circuitry according to the present invention.

FIG. 3 illustrates a schematic diagram of an embodiment of accurate spatial locator circuitry 235 according to the present invention. As shown in FIG. 3, three accelerometers 300, 305, and 310 are provided. Accelerometers 300, 305, and 310 each provide a signal related to the acceleration of receiver 210 in the x, y, and z axial directions, respectively. Each accelerometer 300, 305, and 310 includes an oscillator 315, 320, and 325. In the embodiment shown in FIG. 2, accelerometer 300 determines acceleration in the z direction, accelerometer 305 determines acceleration in the x direction, and accelerometer 310 determines acceleration in the y direction. As is conventional, the x and y direction define a plane parallel with the ground while the z direction defines the height above the ground.

Each accelerometer 300, 305, and 310 can include a micro electro-mechanical device integrated with an integrated circuit, whereby acceleration of the device along one of its three axes results in the output of a serial data stream that indicates the magnitude of the acceleration. The serial data stream can be input to a microcontroller 375 that performs a mathematical time integration to determine the velocity of the motion and a second time integration to determine the distance the accelerometer has moved. In some embodiments, microcontroller 375 can be included in processing circuitry 230 (FIG. 2). Each of the three accelerometers is oriented such that each of the three orthogonal axes (x, y and z) are monitored to determine the distance of motion of line locator 200. In this way the three-dimensional motion of line locator 200 is tracked.

The output signals from each of accelerometers 300, 305, and 310 are provided to processing circuitry 375 that determines the position of line locator 200 with respect to a reference position. The determination of position is based upon prior changes in the output of each accelerometer 300, 305, and 310. The reference position is determined by setting a value in the processing circuitry 375 at the beginning of the measurements. Subsequent values for the spatial position can be determined by adding positional changes calculated based on integrating the output signals of each accelerometer 300, 305, and 310. As has been discussed above, the output signals of each accelerometer 300, 305, and 310 are proportional to the acceleration of line locator 200. The acceleration of line locator 200 can be integrated to determine the change of position of line locator 200 from the reference point by processing circuitry 375.

In some embodiments, processing circuitry 375 may include analog integrators such that the output signal from each of accelerometers 300, 305, and 310 are integrated twice to determine the change in position. In some embodiments, processing circuitry 375 may digitize signals from accelerometers 300, 305, and 310 and either output the digitized signals or digitally integrate those signals to output the data signals indicating change in spatial positioning.

Processing circuitry 375 can communicate through interface 385 with processing circuitry 230 of line locator 200. Processing circuitry 230 also receives the magnitude of electromagnetic field in each location where a change in position is recorded by accurate spatial location circuitry 235. Processing circuitry 375 can then store, in memory 380, each change in position along with the magnitude of the electromagnetic field at that position. In this way each of electromagnetic field magnitude can be mapped to a corresponding position. Alternatively, processing circuitry 375 can communicate through interface 385 to provide processing circuitry 230 of line locator 200 a determination of the change in position of receiver 210.

Processing circuitry 230, or processing system 290, can compare the change in electromagnetic field strengths with position with available models to determine how many and what types of lines 250 are below ground 255 in the area-of-interest. Other methods to determine the number and types of lines 250 below ground 255 include searches for predetermined patterns in the map, magnitude changes at boundaries, and other known pattern recognition approaches. Further, a distortion in the field, e.g. greater electromagnetic field magnitudes at particular spatial locations than are expected, could be found to show that additional lines are in the area of lines 250.

Figure 4:
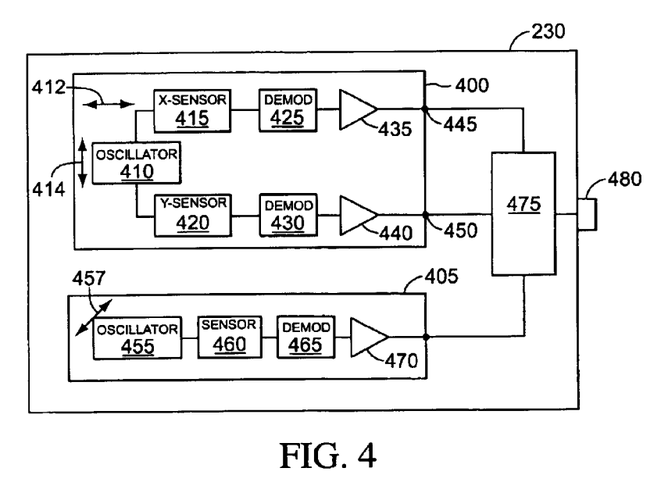
FIG. 4 illustrates a schematic diagram of another embodiment of the accurate spatial locator circuitry according to the present invention.

FIG. 4 illustrates another embodiment of accurate spatial locator circuitry 235 according to the present invention. As shown in FIG. 4, accelerometer 400 is capable of motion in the x-axial direction 412 and the y-axial direction 414. The output is measured by x-sensor 415, for determining motion in x-axial direction 412, and by y-sensor 420, for determining motion in y-axial direction 414. Both x-sensor 415 and y-sensor 420 are coupled to a demodulator 425 and 430, each of which are then coupled to an amplifier 435 and 440. In this way, a single accelerometer can track motion in two-directions. Accelerometer 405 includes an oscillator 455, which tracks motion in the z-direction 457, sensor 460, demodulator 465, and amplifier 470. Both accelerometers 400 and 405 provide output signals to processing circuitry 475 that functions in a manner similar to processing circuitry 375 described with respect to FIG. 3.

Integration of the signals provided by sensors 415, 420, and 460, in order to determine the position of line locator 200, can occur in a number of places including sensors 415, 420, and 460 themselves. Alternatively, integration can occur in demodulators 425, 430, and 465, amplifiers 435, 440, and 470, or processing circuitry 475. Further, in some embodiments, processing circuitry 230 can perform the integration functions.

Accelerometers 300, 305, 310, 400, and 405 can be small and inexpensive devices such as the accelerometers utilized to trigger airbags on automobiles. Inexpensive accelerometers have limited temporal stability, however would have sufficient stability over the time required to provide a high level of spatial accuracy. Further, the requirement for line locator 200 according to the present invention may be much less demanding than the requirements for making maps of absolute position, for example. In some embodiments, it is sufficient to produce a differential map, whereby the absolute spatial position of the field strength is not relevant, but the field strength at a relative position from a reference position is important. If an absolute mapping system were required, the inertial mapping system would be initialized at a specific landmark or reference position, and the map created by the system would be relative to this reference point. The time required to locate a line could be small enough such that an accelerometer with a moderate drift in accuracy would be acceptable for this application and still yield sufficiently accurate results.

Accurate spatial locator circuitry 235, as depicted in FIGS. 3 and 4, need not include a means for measuring movement of line locator 200 in the z-axial direction. However, an advantage of measuring motion in the z-axial direction is that the movement in the z-direction can be factored into calculations of distance 270 and can be utilized to improve the accuracy of line locator 200. Additionally, measurements of the z-position of locator 200 can improve the ability to detect field distortion.

Further, accurate spatial locator circuitry 235 can be arranged to determine the change in position of the line locator in any two-dimensional plane that is created from the x, y, and z-axial directions and not only planes that are in only two of those axial directions.

Figure 5:
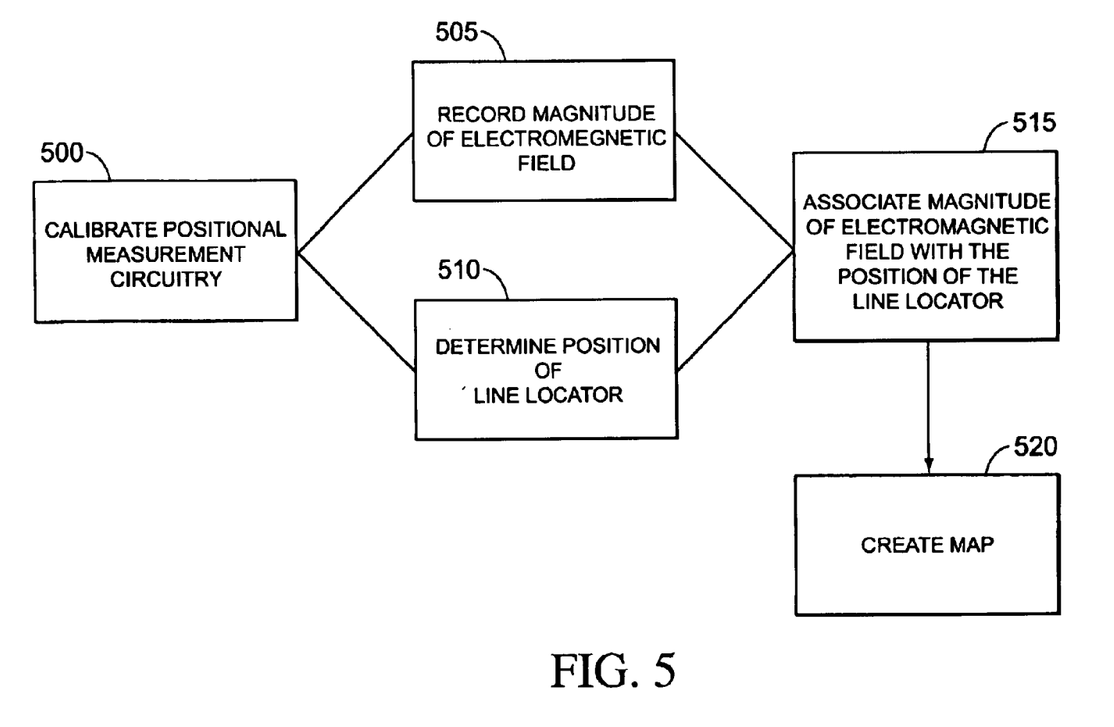
FIG. 5 illustrates a flow chart of the operation of a line locator according to the present invention.

FIG. 5 shows a flow chart of the operation of a method of line location according to the present invention. In FIG. 5, accurate spatial locator circuitry 235 on line locator 200 is calibrated, as shown in step 500. Calibration can be accomplished by resetting processing circuitry 230 or accurate spatial locator circuitry 235 to a reference position.

In embodiments where accurate spatial location circuitry 230 includes accelerometer 300 or 400, calibration includes setting a direction of motion of accelerometer 300 or 400 prior to motion of receiver 210. Where accurate spatial location 230 includes a triangulation, tri-lateration, or range finder system, a first positional determination is made during calibration. The first positional determination is used as a reference position for all other measurements.

Line locator 200 then records a magnitude of an electromagnetic field referenced to the position of receiver 210, as shown in step 505. The position of receiver 210 is determined with respect to a reference position, as shown in step 510. The reference position, in some embodiments, is the position where receiver 210 was calibrated. However, the reference position can be any position that is provided to line locator 200 either before or after calibration, so long as all of the positions are adjusted based upon a difference between the reference position and the position where the accurate spatial locator circuitry 235 began taking accurate spatial locations.

After both the position and magnitude are determined, regardless of whether the position is to be later adjusted, the position and magnitude are associated together, as shown in step 515. Association means that they are either simultaneously included in a map of magnitudes or stored so that when one is accessed the other can be recalled and a map of magnitudes can be made from the information.

A map of the magnitudes as a function of spatial position is then made in step 520. The map can be displayed on display 260 of line locator 210, in real time, displayed and updated on a regular basis, or can be stored in a memory and then displayed at a later time. The mapping step can be omitted where a map is created at a later time based upon the associated magnitudes and positions.

While FIG. 5 describes determining a position of the line locator, step 510, it is possible to determine the values of data output by processing circuitry 230. The values would then be associated with magnitudes of electromagnetic field 240 made at the same time. At a later time, the values can be compared to values generated upon calibration and prior values to determine what the position of receiver 210 was at the time when the magnitude of electromagnetic field 280 was determined.

As used herein, a map is a two-dimensional or three-dimensional representation of magnitudes or other characteristics of a signal, e.g. magnetic field strength, correlated with spatial positioning. The map can be a displayable image or information stored in memory. An image of the map may differentiate the magnitudes or characteristics by shading, color, gradient shapes, or any other known method.

Figure 6A:
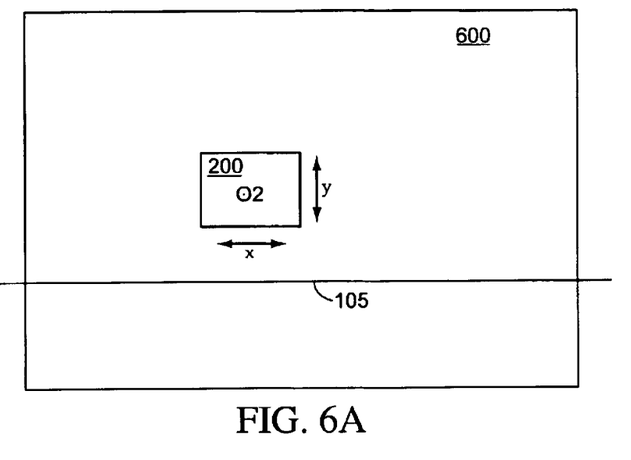
FIG. 6A illustrates use of a line locator according to the present invention where the accurate spatial locator circuitry includes at least one accelerometer.
Figure 6B:
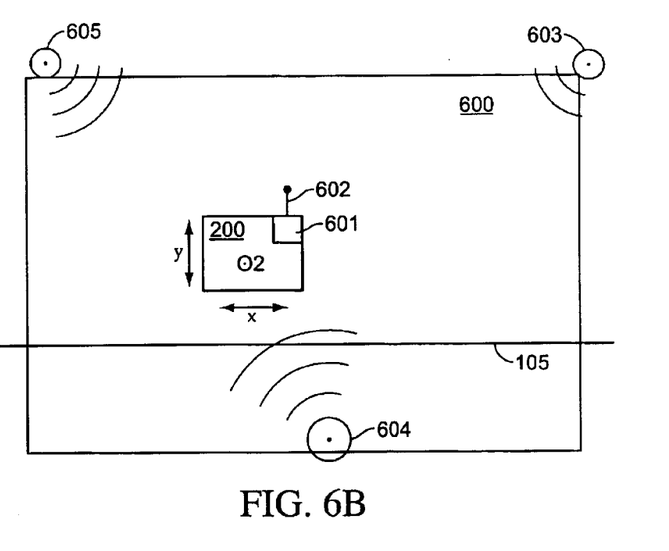
FIG. 6B illustrates use of a line locator according to the present invention where the accurate spatial locator circuitry includes a rangefinder.
Figure 6C:
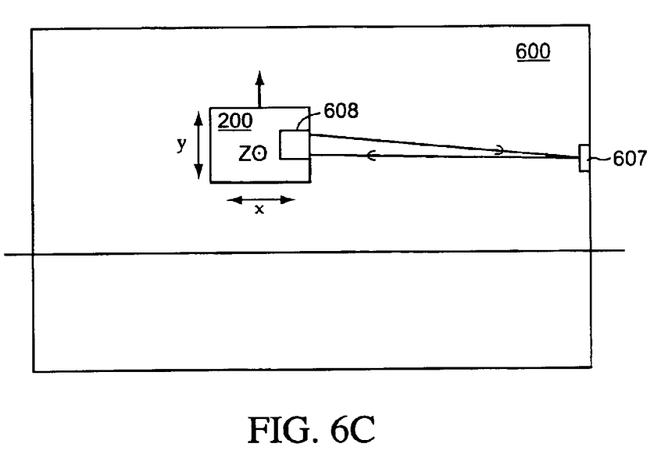
FIG. 6C illustrates use of a line locator according to the present invention where the accurate spatial locator circuitry includes a triangulation system.

FIGS. 6A, 6B and 6C illustrate operation of line locator 200 in accordance with the present invention. In FIG. 6A, accurate spatial locator circuitry 235 includes accelerometers such as is illustrated in FIGS. 3 and 4. In FIG. 6B, accurate spatial locator circuitry 235 includes a triangulation system. In FIG. 6C, accurate spatial locator circuitry 235 includes a rangefinder system.

As shown in FIG. 6A, embodiments of line locator 200 where accurate spatial locator circuitry 235 includes accelerometers, such as accelerometers 300, 305 or 310 shown in FIG. 3 or accelerometers 400 and 405 as shown in FIG. 4, is physically moved over a region of interest 600. Region of interest 600 can include an underground line 150, along with other lines, obstructions, or distortion-inducing structures. In some embodiments, an operator may trigger measurement of a position and electromagnetic field by, for example, pushing a button on line locator 200. In some embodiments, line locator 200 can automatically take data on timed intervals.

FIG. 6B shows an embodiment of line locator 200 where accurate spatial locator circuitry 235 includes a triangulation system. As shown in FIG. 6B, a number of transmitters are distributed in known positions in the vicinity of region of interest 600. Transmitters 603, 604 and 605 are positioned around region of interest 600. In general, any number of transmitters (including one) can be utilized in this method. Line locator 200 includes receiver 601 and antenna 602. Transmitters 603, 604 and 605 may transmit at different frequencies. Receiver 601 receives the transmission from each of transmitters 603, 604 and 605 and determines the distance between antenna 602 and each of transmitters 603, 604 and 605. As is well known, the distance between receiver 601 and any one of transmitters 603, 604 and 605 can be accomplished in a number of ways, including determining the number of wavelengths traversed while receiver 601 is being moved or by monitoring the intensity of the signal received from transmitters 603, 604 and 605. A single one of transmitters 603, 604 and 605 can be utilized where antenna 602 includes two separated antennas for determination of the direction between line locator 200 and the single one of transmitters 603, 604 and 605.

FIG. 6C shows utilization of an embodiment of line locator 200 where accurate spatial locator circuitry 235 includes a range finder 608. Range finder 608 may be a laser range finder or other range finding mechanism. As is well understood, range finder 608 can determine both distance and direction to a fixed object 607 by reflecting radiation from fixed object 607.

Although the present disclosure refers to the use of magnitudes of electromagnetic fields to determine the location of objects, other means can be used with the circuits and systems described herein. For example, acoustic detection utilizing receivers and transmitters, acoustic detection of sounds made by underground water lines, electric field or magnetic field detection without using a transmitter, or the like.

The embodiments of the invention described above are merely illustrative, to be limiting. While the embodiments, applications and sent inventions have been depicted and described, there are nts, applications and advantages possible without deviating it of the inventive concepts described and depicted herein. As invention should be limited only by the following claims.

What is claimed is:

1. A line locator system, comprising:
   at least one detector that measures a magnitude of an electromagnetic field;
   an accurate spatial location system that provides a spatial position relative to a reference position located near an area-of-interest; and
   a processing system containing information including data that associates the magnitude of the electromagnetic field with the spatial position, wherein the information is stored in the processing system in a manner that allows recall of the data from the processing system by access via either the magnitude of the electromagnetic field or the spatial position, alone;
   wherein determining the difference of the position of the line locator with respect to the reference position comprises detecting motion by the line locator and determining the difference of position based upon motion of the line locator.

2. A line locator system comprising:
   at least one detector that measures a magnitude of an electromagnetic field:
   an accurate spatial location system that provides a spatial position relative to a reference position located near an area-of-interest; and
   a processing system containing information including data that associates the magnitude of the electromagnetic field with the spatial position, wherein the information is stored in the processing system in a manner that allows recall of the data from the Processing system by access via either the magnitude of the electromagnetic field or the spatial position, alone;
   wherein the processing system generates a map of the electromagnetic field at a plurality of spatial positions.

3. A line locator system comprising:
   at least one detector that measures a magnitude of an electromagnetic field;
   an accurate spatial location system that provides a spatial position relative to a reference position located near an area-of-interest; and
   a processing system containing information including data that associates the magnitude of the electromagnetic field with the spatial position, wherein the information is stored in the processing system in a manner that allows recall of the data from the processing system by access via either the magnitude of the electromagnetic field or the spatial position, alone;
   wherein the magnitude of the electromagnetic field and the spatial position are downloaded to a computer, the computer comparing the electromagnetic field and the spatial position with expected values of the electromagnetic field and the spatial position.

4. A method for determining the position of underground lines utilizing a line locator, the method comprising the steps of:
   determining a magnitude of a signal detected by the line locator at a position;
   determining a difference of the position of the line locator with respect to a reference position; and
   associating information, within a data processing system, including first data representative of the difference in position and second data representative of the magnitude of the signal at the position, such that the first data is associated with the second data in a manner that allows recall of information from the processing system by entry of either the first data or the second data, alone;
   wherein determining the difference of the position of the line locator with respect to the reference position comprises detecting motion by the line locator and determining the difference of position based upon motion of the line locator.

5. A method for determining the position of underground lines utilizing a line locator, the method comprising the steps of:
   determining a magnitude of a signal detected by the line locator at a position;
   determining a difference of the position of the line locator with respect to a reference position; and
   associating information, within a data processing system, including first data representative of the difference in position and second data representative of the magnitude of the signal at the position, such that the first data is associated with the second data in a manner that allows recall of information from the processing system by entry of either the first data or the second data, alone;
   wherein determining the magnitude comprises determining the magnitude of the signal at a plurality of positions, wherein determining the difference of the position comprises determining a difference of each the plurality of positions with respect to the reference position, and the method further comprising generating a map based upon each of the magnitudes and associated differences of position.

6. A method for determining the position of underground lines utilizing a line locator, the method comprising the steps of:
   determining a magnitude of a signal detected by the line locator at a position;
   determining a difference of the position of the line locator with respect to a reference position, wherein determining the difference in position comprises determining a difference in x, v and z coordinates between the position and reference position; and
   associating information, within a data processing system, including first data representative of the difference in position and second data representative of the magnitude of the signal at the position, such that the first data is associated with the second data in a manner that allows recall of information from the processing system by entry of either the first data or the second data, alone;
   wherein the difference in the x, y, and z coordinates between the position and reference position is determined utilizing at least one accelerometer to detect motion of the position in the x, y, and z coordinates.

7. A method for determining the position of underground lines utilizing a line locator, the method comprising the steps of:
   determining a magnitude of a signal detected by the line locator at a position;
   determining a difference of the position of the line locator with respect to a reference position; and associating information, within a data processing system, including first data representative of the difference in position and second data representative of the magnitude of the signal at the position, such that the first data is associated with the second data in a manner that allows recall of information from the processing system by entry of either the first data or the second data, alone;

wherein determining the difference in position comprises tri-laterating the position of the line locator based upon signals received from two or more local transmitters.

8. A method for determining the position of underground lines utilizing a line locator, the method comprising the steps of:

determining a magnitude of a signal detected by the line locator at a position;

determining a difference of the position of the line locator with respect to a reference position; and associating information, within a data processing system, including first data representative of the difference in position and second data representative of the magnitude of the signal at the position, such that the first data is associated with the second data in a manner that allows recall of information from the processing system by entry of either the first data or the second data, alone;

wherein determining the difference in position comprises triangulating the position of the line locator based upon signals received from one or more local transmitters.

9. A line locator for determining the position of underground lines, comprising:

at least one detector;

detection circuitry comprising an input coupled to the at least one detector and an output; and means for determining a difference between a position of the line locator and a reference position comprising an output;

wherein the means for determining comprises means for generating a map of magnitudes of the signal at a plurality of positions, each of the plurality of positions determined by determining a difference between each of the plurality of positions and the reference position.

10. A line locator for determining the position of underground lines, comprising:

at least one detector;

detection circuitry comprising an input coupled to the at least one detector and an output; and means for determining a difference between a position of the line locator and a reference position comprising an output;

wherein the means for determining comprises means for triangulating the position of the line locator based upon a signal received from two or more local transmitters.

11. A line locator for determining the position of underground lines, comprising:

at least one detector;

detection circuitry comprising an input coupled to the at least one detector and an output; and means for determining a difference between a position of the line locator and a reference position comprising an output;

wherein the means for determining comprises means for tri-laterating the position of the line locator based upon a signal received from two or more local transmitters.

12. The line locator system of claim 1, wherein the accurate spatial location system includes one or more accelerometers.

13. The line locator system of claim 1, wherein the accurate spatial location system includes a receiver configured to receive signals from one or more local transmitters positioned relative to the reference position, the accurate spatial location system determining a position of the line locator with respect to the reference position based upon the signals received at an antenna of the receiver.

14. The line locator system of claim 1, wherein the accurate spatial location system includes a range finder, the range finder being configured to determine motion of the line locator system based upon detected radiation reflection from an object positioned relative to the reference position.

15. The line locator system of claim 1, further comprising a transmitter coupled to induce the electromagnetic field from an underground line.

16. The line locator system of claim 1 wherein the processing system determines whether a distortion exists in the electromagnetic field.

17. The line locator system of claim 1, wherein the processing system stores the magnitude of the electromagnetic field and the spatial position in a memory.

18. The line locator system of claim 17, wherein the processing system determines positions of underground lines based on the magnitude of the electromagnetic field and the spatial positions stored in the memory.

19. The line locator system of claim 2, wherein the accurate spatial location system includes one or more accelerometers.

20. The line locator system of claim 2, wherein the accurate spatial location system includes a receiver configured to receive signals from one or more local transmitters positioned relative to the reference position, the accurate spatial location system determining a position of the line locator with respect to the reference position based upon the signals received at an antenna of the receiver.

21. The line locator system of claim 2, wherein the accurate spatial location system includes a range finder, the range finder being configured to determine motion of the line locator system based upon detected radiation reflection from an object positioned relative to the reference position.

22. The line locator system of claim 2, further comprising a transmitter coupled to induce the electromagnetic field from an underground line.

23. The line locator system of claim 2, wherein the processing system determines whether a distortion exists in the electromagnetic field.

24. The line locator system of claim 2, wherein the processing system stores the magnitude of the electromagnetic field and the spatial position in a memory.

25. The line locator system of claim 24, wherein the processing system determines positions of underground lines based on the magnitude of the electromagnetic field and the spatial positions stored in the memory.

26. The line locator system of claim 3, wherein the computer determines positions of underground lines based on the electromagnetic field and the spatial position.

27. The line locator system of claim 3, wherein the accurate spatial location system includes one or more accelerometers.

28. The line locator system of claim 3 wherein the accurate spatial location system includes a receiver configured to receive signals from one or more local transmitters positioned relative to the reference position, the accurate spatial location system determining a position of the line locator with respect to the reference position based upon the signals received at an antenna of the receiver.

29. The line locator system of claim 3, wherein the accurate spatial location system includes a range finder, the range finder being configured to determine motion of the line locator system based upon detected radiation reflection from an object positioned relative to the reference position.

30. The line locator system of claim 3, further comprising a transmitter coupled to induce the electromagnetic field from an underground line.

31. The line locator system of claim 3, wherein the processing system determines whether a distortion exists in the electromagnetic field.

32. The line locator system of claim 3, wherein the processing system stores the magnitude of the electromagnetic field and the spatial position in a memory.

33. The line locator system of claim 32, wherein the processing system determines positions of underground lines based on the magnitude of the electromagnetic field and the spatial positions stored in the memory.

34. The method of claim 4 wherein detecting motion by the line locator comprises detecting acceleration of the line locator.

35. The method of claim 4, wherein the signal is related to a magnetic field and the method further comprises determining a distortion of the magnetic field based upon the difference in position and the magnitude of the magnetic field.

36. The method of claim 35 further comprising providing a distortion indication signal to a user of the line locator when a determination is made that one or more lines are underground in the area.

37. The method of claim 35 further comprising correcting the magnitude of the electromagnetic field that is detected based upon the distortion.

38. The method of claim 4, wherein determining the difference in position comprises determining a difference in a plane between the position and the reference position.

39. The method of claim 4, wherein determining the difference in position comprises determining a difference in x and y coordinates between the position and reference position.

40. The method of claim 39, wherein determining a difference in x and y coordinates comprises determining a difference in x, y, and z coordinates.

41. The method of claim 4, wherein determining the difference in position comprises determining a distance of the line locator with respect to a fixed landmark.

42. The method of claim 5 further comprising determining a number of underground lines in an area underground of the plurality of positions based upon the shape of the signal.

43. The method of claim 5 further comprising determining a position of one fine of the one or more lines based upon the map.

44. The line locator of claim 9, wherein the means for determining the difference comprises means for determining the difference in the x and y coordinates.

45. The line locator of claim 9, wherein the means for determining the difference comprises means for determining the difference in x, y, and z coordinates.

46. The line locator of claim 9, further comprising a transmitter that provides a signal a reflection of which is detected by the at least one detector.

47. The line locator of claim 9, wherein the means for determining comprises means for determining a distance between a landmark and the position of the line locator and the reference position.

48. The line locator of claim 10, wherein the means for determining further comprises means for determining a distance between a landmark and the position of the line locator and the reference position.

49. The line locator of claim 11, wherein the means for determining further comprises means for determining a distance between a landmark and the position of the line locator and the reference position.

* * * * *

UNITED STATES PATENT AND TRADEMARK OFFICE
CERTIFICATE OF CORRECTION

| | |
|---|---|
| PATENT NO. | : 7,120,564 B2 |
| APPLICATION NO. | : 10/407705 |
| DATED | : October 10, 2006 |
| INVENTOR(S) | : Gordon Pacey |

It is certified that error appears in the above-identified patent and that said Letters Patent is hereby corrected as shown below:

Claim 2, col. 13, line 41, "Processing" should read --processing--.

Claim 6, col. 14, line 48, "x, v, z" should read --x, y and z--.

Signed and Sealed this

Ninth Day of January, 2007

JON W. DUDAS
*Director of the United States Patent and Trademark Office*